United States Patent [19]

Hodgson et al.

[11] Patent Number: 5,174,552
[45] Date of Patent: Dec. 29, 1992

[54] FLUID MOUNT WITH ACTIVE VIBRATION CONTROL

[75] Inventors: Douglas A. Hodgson, Cary; Charles M. Nobles, Jr., Fuquay-Varina, both of N.C.; Peter J. Jones, Erie, Pa.; Mark R. Jolly, Davis; Donald L. Margolis, Elmacero, both of Calif.

[73] Assignee: Lord Corporation, Erie, Pa.

[21] Appl. No.: 776,118

[22] Filed: Oct. 15, 1991

[51] Int. Cl.5 .................. B64D 27/26; F16F 7/10; B60G 13/02
[52] U.S. Cl. .................. 267/140.11; 188/299; 188/378; 244/54; 248/562; 248/557; 248/638; 267/136; 267/219; 180/300
[58] Field of Search .......... 267/140.1 R, 140.1 A, 267/140.1 AE, 219, 220, 136, 195, 152, 153, 140.1 E; 248/562, 636, 557, 638, 550; 244/54; 280/707; 188/299, 378, 379, 380, 322.5; 180/300, 902, 312

[56] References Cited

U.S. PATENT DOCUMENTS

| 3,288,404 | 11/1966 | Schmidt et al. | 244/54 X |
|---|---|---|---|
| 3,415,470 | 12/1968 | Woodford et al. | 188/322.5 |
| 4,033,541 | 7/1977 | Malueg | 248/358 R |
| 4,236,607 | 12/1980 | Halwer et al. | 188/379 |
| 4,531,484 | 7/1985 | Kimura et al. | 123/192 R |
| 4,650,170 | 3/1987 | Fukushima | 267/140.1 |
| 4,709,907 | 12/1987 | Thorn | 267/195 X |
| 4,793,599 | 12/1988 | Ishioka | 267/140.1 |
| 4,811,919 | 3/1989 | Jones | 244/54 |
| 4,869,474 | 9/1989 | Best et al. | 267/219 |
| 4,964,516 | 10/1990 | Thorn | 267/140.1 R |
| 4,969,632 | 11/1990 | Hodgson et al. | 267/219 X |
| 5,029,823 | 7/1991 | Hodgson et al. | 267/219 X |
| 5,052,510 | 10/1991 | Gossman | 180/300 |
| 5,067,684 | 11/1991 | Garnjost | 248/550 |

Primary Examiner—Douglas C. Butler
Attorney, Agent, or Firm—R. K. Thomson

[57] ABSTRACT

A fluid mount with the capability of actively controlling the amount of vibrational energy transmitted thereacross. An actuator is provided in series or in parallel with the inertia track passageway of a double pumper isolation mount to permit the dynamic stiffness of the mount to be varied so as to control the amount of vibrational energy transmitted in a desired manner. A control system for permitting frequency-shaped force feedback control of the device is also disclosed. Utilization of the device as a tuned absorber is also described.

20 Claims, 12 Drawing Sheets

FORCE DISTURBANCE SPECTRUM

SHAPING FILTER SPECTRUM

ACTIVE ISOLATOR RESPONSE SPECTRUM

FORCE DISTURBANCE SPECTRUM

SHAPING FILTER SPECTRUM

ACTIVE ISOLATOR RESPONSE SPECTRUM

DYNAMIC STIFFNESS ENVELOPE FOR DISCRETE TONE ISOLATION

DYNAMIC STIFFNESS FOR BROAD-BAND DISTURBANCE ISOLATION

INSTANTANEOUS DYNAMIC STIFFNESS ISOLATION
OF TWO DICRETE TONES

FLUID MOUNT WITH ACTIVE VIBRATION CONTROL

TECHNICAL FIELD

The present invention relates to improvements in vibration dampers and absorbers. More particularly, the present invention is directed to improvements in active vibration mounts and controller systems thereof.

BACKGROUND AND SUMMARY OF THE INVENTION

The technology for controlling the transmission of vibrational energy between a disturbance source such as an engine or powerplant and a support structure such as a pylon or airframe of an aircraft has been continuously evolving. Initially, engines were directly or "hard" mounted to the structure. With such a mount, the base structure experiences all vibrations of the engine. In the first attempts at isolation, solid blocks of rubber were used to isolate an aircraft engine from its support pylon for fixed wing applications or from the air frame for rotary wing utilization. An early example of these elastomeric mounts is taught in U.S. Pat. No. 3,288,404 issued to Schmidt. While softner elastomer sections were preferred for their isolation characteristics, the stiffer elastomer sections were preferred for their durability and stability in maintaining the position of the engine.

Second generation mounts included fluids in elastomeric chambers, the fluids being relied upon to add damping, i.e., to dissipate energy through absorbing the vibrational impact by resisting motion. An example of such a fluid mount is shown in U.S. Pat. No. 3,415,470 issued to Woodford et al. This patent discloses the use of a viscous fluid to provide damping for low frequency, high amplitude vibrations.

In U.S. Pat. No. 4,236,607, Halwes et al. recognized that fluid in mounts had potential utility beyond its use as damping material. The fluid could be used as a mass to alter vibrational characteristics of the system by employing the inertia created by the fluid mass. An inner housing functions as a piston to throttle fluid through a small passage, thus amplifying the induced inertia forces of the fluid movement. One of the benefits of a fluid inertia mount is the ability to create a notch in the dynamic stiffness curve which can be designed or tuned to match a common operating frequency of the source or the system, thereby reducing the force transmitted at that frequency.

While offering some advantages over the conventional fluidless elastomeric mounts, fluid damping and inertia type mounts are both passive, that is, they cannot be adjusted to accommodate variations in the system. Development continued along two separate paths at this point: active mounts and adaptive mounts. The latter will be discussed first.

An adaptive mount behaves differently depending upon conditions. The term "adaptive" embraces a number of very different concepts. Generally, an adaptive mount changes one of the parameters of the mount in order to change its behavior. For example, in a mount having alternative fluid flow paths, the behavioral characteristics of the flow paths can differ significantly. One group of mounts for automative application employ a decoupler mechanism. At low amplitude, medium to high frequency applications, a major portion of the fluid will be pumped around the decoupler, or in some cases, oscillate the decoupler through a short stroke within a large diameter orifice. When a high amplitude, low frequency disturbance occurs, such as a shock load, the decoupler blocks off flow causing the fluid to transit a lengthy, small diameter inertia track where, in essence, the fluid is throttled through the inertia track and undergoes significant damping. Such a mount is shown in U.S. Pat. No. 4,709,907 issued to Thorn.

Another way to change the characteristics of the mount is to change the dimensions of the inertia track. This can include changing the length, the effective cross section, or both. One such mount is disclosed in U.S. Pat. No. 4,969,632 issued to Hodgson et al.

Yet a third way to change mount characteristics is to vary the yeild stress of the fluid. To effect a significant variation, a fluid that is susceptible to such yield stress changes, such as an electrorheological (ER) fluid, for example, should be used. Such a mount is shown in U.S. Pat. No. 5,029,823 issued to Hodgson et al.

As previously mentioned, parallel development was occurring in active mounting systems. Examples of such active systems are found in U.S. Pat. Nos. 4,033,541 to Malueg for use in controlling a payload platform, 3,477,665 to Legrand for use on helicopters, and 4,869,474 to Best et al. for use in automotive mounts. The operation of an active mount involves the sensing of some output parameter of the system and, using an extrinsic power source, inputting energy to counter the effect of the vibrational energy of the source. While these active systems may be suitable for some applications, those which have been developed to date are complex and as they may be used for fixed and rotary wing applications, require a very large power source to directly counter the vibrational energy of the large, high-powered engines.

Recently, attempts have been made to apply noise cancellation technology to structural vibration problems. Some attempts involve evaluating the vibrational energy as it reemerges as sound (in the cabin of an aircraft, for example) and producing a second sound wave 180° out of phase to cancel the noise transmission. Other attempts impart the second vibrational wave which is 180° out of phase directly into the structure to cancel the vibration. See, for example, U.S. Pat. No. 4,562,589 issued to Warnaka et al. The difficulties associated with either approach should be apparent since, when the cancellation signal has a source space from the disturbance source, what is 180° out of phase at one spatial location, will have a different phase relationship (and, therefore, not fully cancel) at another location. Further, by inputting additional energy into the structure, this solution aggravates, rather than alleviates, problems associated with material stresses, structural fatigue, etc. While not all applications will permit the use of an isolation solution due to the primary path of vibration transmission, as in the case of Warnaka et al., where the primary path is through an "energy bottleneck", an isolation mount becomes a perferable solution.

Before describing the features of the present invention, another development should be mentioned. The fluid mounts mentioned above are generally of the single pumper variety, that is, they pump fluid from a first chamber to a second chamber and rely on pressure equalization (i.e., suction) to return the fluid to the first chamber. When pulling a column of fluid, particularly at the frequencies and amplitudes associated with an aerospace mount, there is considerable risk of cavitation, separation of the fluid due to a pressure lower than the vapor pressure of the fluid which is being urged to move. In U.S. Pat. No. 4,811,919 to Jones, a double pumper mount is disclosed in which fluid is pumped to and from a second chamber from and to a first chamber by a two-sided, double-acting piston. When combined with the air-over hydraulic volume compensator, the double pumper mount virtually eliminates the risk of cavitation for most operating conditions since the fluid is under compression, never in tension, as it is pushed. A further distinction of the double pumper mount is that the volume stiffnesses of the two fluid chambers are substantially similar (i.e., as equal as possible) whereas the volume stiffnesses of the chambers of a single pumper mount are significantly (generally, several orders of magnitude) different.

The present invention is an improved active double pumper mount. An actuator is provided in parallel or in series with the passive inertia track to vary the rate of fluid oscillation in the inertia track to control the amount of vibrational energy transmitted between the source of vibrational energy and its base in a desired manner. The passive inertia track will have a characteristic notch at a frequency the isolation system is being designed to control. In the case of an isolator, flow can be altered by the actuator to drive the dynamic stiffness at the notch to zero, that is, to counteract the parasitic damping forces created by the elastomer and the resistance to flow in the fluid passageways. This sytem takes advantage of the amplification made available by the doulbe-acting piston and the fact that the passive notch lessens the dynamic stiffness at this critical frequency. Therefore, a key feature of this system is that it is more efficient than earlier active mounts, requiring less power input and, hence, a smaller power source and/or actuator. In fact, the actuator needed is so small, that for most embodiments, it can be internalized within the mount. While the actuator enables the mount to become a more efficient isolator for one frequency or range frequencies, it also permits the same mount to be an effective damper for other frequencies. Indeed, for an application where the mount encounters only one or two primary excitation frequencies, the actuator can be controlled in such a manner as to drive the dynamic stiffness of the mount to zero over a wide range of frequencies, say, for example, from 20-200 Hz.

This device may be used as a tuned absorber for a variety of applications. In a typical active absorber case, force is input through the actuator to cancel essentially all of the vibrational motion at the point the absorber is attached to the structure. Typically, the energy of the absorber will be 180° out of the phase with respect to the effect of the vibrational energy of the source at the point of attachment of the absorber. If the absorber is operated at a frequency near resonance, the available cancellation force will be maximized.

Various other features, advantages and characteristics of the present invention will become apparent after the reading of the following detailed description.

BRIEF DESCRIPTION OF THE DRAWINGS

The appended Figures set forth the features of the preferred embodiments of the present invention with like elements bearing like reference numerals and, in which.

DETAILED DESCRIPTION OF THE PREFERRED EMBODIMENTS

Figure 1:
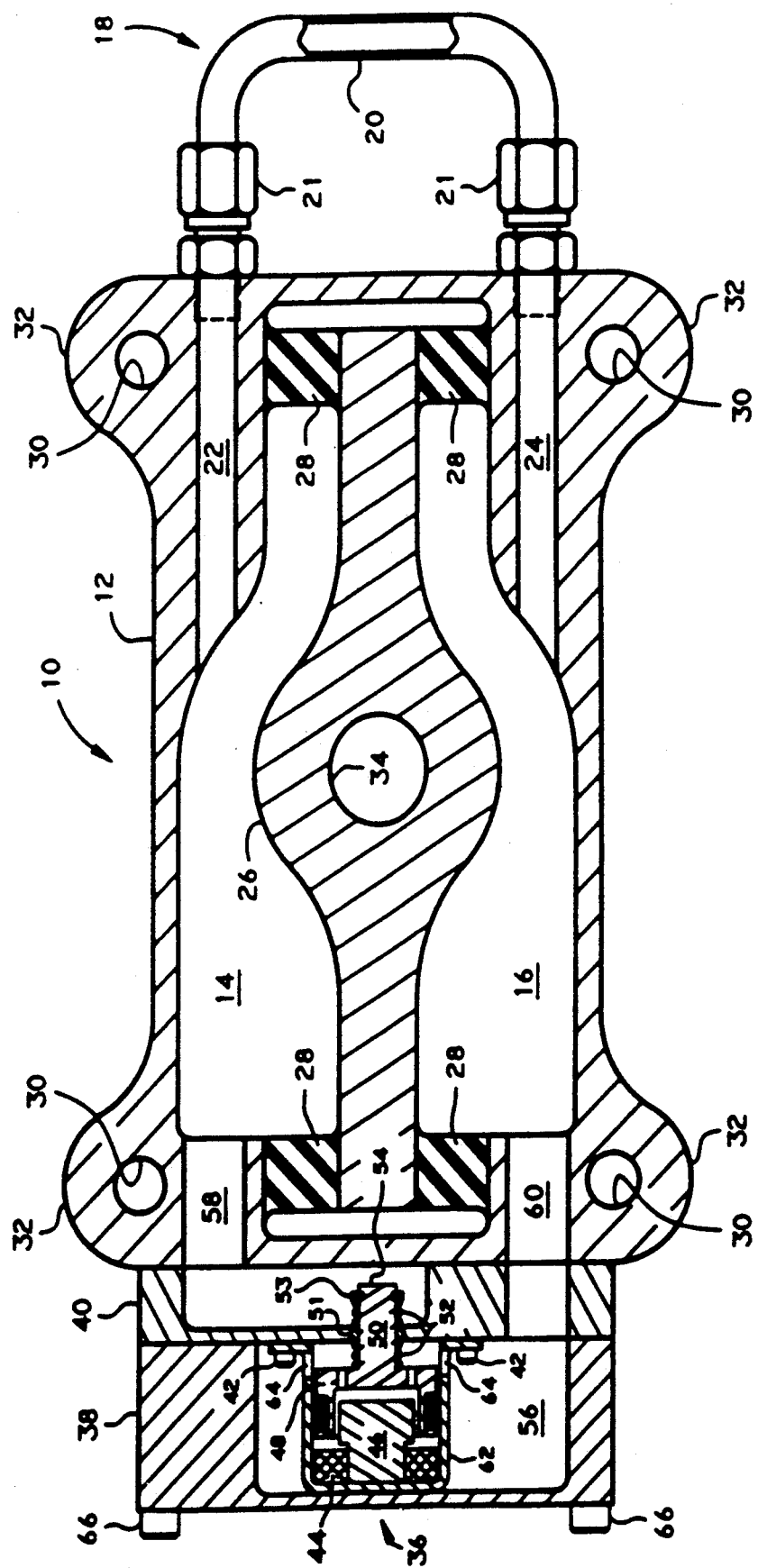
FIG. 1 is a cross-sectional side view of a first embodiment of the active mount of the present invention.

A first embodiment of the fluid mount of the present invention is shown in FIG. 1 generally at 10. The mount 10 is configured generally like the fluid mount of U.S. Pat. No. 4,811,919 issued to Jones, which patent is hereby incorporated by reference. The details of the laminated elastomeric construction and the volume compensator have been omitted from the figures of this application since they form no part of the present invention and would, therefore, add unneccessary complexity to the figures.

Fluid mount 10 comprises a housing 12 which defines, in part, a first fluid-filled compliant chamber 14 and a second such chamber 16 whose volume stiffnesses are substantially similar. As noted in the Jones patent, the mount will be designed to have chambers with volume stiffnesses greater than 100 psi per cubic inch; indeed, volume stiffnesses of 5000 psi/in$^3$ or higher may be appropriate for some applications. More typically, mounts for helicopter applications will have chambers with volume stiffnesses in the 200-500 psi/in$^3$ range, while fixed wing applications will require volume stiffnesses in the 1000-2000 psi/in$^3$.

Fluid-filled chambers 14 and 16 are interconnected by a passageway 18. Passageway 18 has an external tube or inertia track portion 20 interconnected with internal inertia track portions 22 and 24. A double-acting piston 26 divides chamber 14 from chamber 16 and is mounted in housing 12 by blocks 28 of elastomer. Elastomerr blocks 28 are bonded to piston 26 and housing 12 in a conventional manner. When this device 10 is used as an isolation mount, housing 12 is attached to the engine bulkhead by bolts (not shown) extending through openings 30 in flanges 32. A stub shaft from the pylon extending down from the aircraft wing (not shown) will be received in opening 34 in pistion 26. As the engine vibration causes housing 12 to vibrate relative to the pylon and piston 26, the piston 26 will cause vibrational energy to be transmitted by the fluid in chamber 14 to the fluid in chamber 16 through inertia track 18, and back again as a result of the return stroke of the piston. Passage through the inertia track throttles the fluid and amplifies the induced inertia forces.

The hardware discussed thus far is the same in all essential details as the passive fluid mount of the Jones patent, supra. The passive mount will have a notch frequency at which the dynamic stiffness of the mount (and transmitted vibrational energy) reaches a minimum value. The frequency at which this minimum occurs can be turned by changing the length and area parameters of external inertia track 20 (once the length and diameter of track portions 22 and 24 have been fixed). Track portion 20 has been shown with couplings 21 for permitting changeout, although the mount 10 will typically be designed for a particular engine application and change to vary the operating characteristics will not normally be necessary. However, should the operational characteristics of the engine change over the life of the system, changeout could be made. The mount 10 will typically be designed to postion the notch at a frequency of particular significance, e.g., the rotational frequency of the engine turbine fan at cruising velocity.

Figure 6:
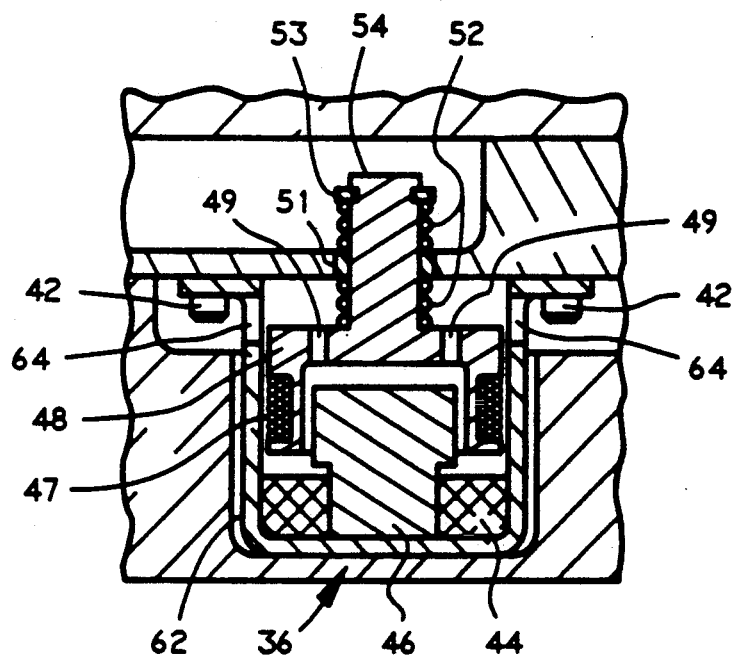
FIG. 6 is an enlarged cross-sectional side view showing the details of an electro-magnetic actuator which may be used in the mount of the present invention.

Actuator 36 is shown in FIG. 1 as positioned in an auxiliary housing 38. Actuator 36, as best seen in FIG. 6, can be fastened in place to member 40 by bolts 42. In this embodiment, actuator 36 is depicted as an electromagnetic actuator featuring magnet 44, pole piece 46, voice coil 48, spool 50 with centering springs 52. The centering spring nearest the spool end 54 reacts against and is retained by circlip 53. Actuator 36 is received in an opening 56 which communicates with second chamber 16 through passageway 58. The end 54 of spool 50 communicates with first chamber 14 through passageway 60. Spool 50 is received in a self-lubricating bushing 51 which may be made of Rulon ® plastic or the like. The laterally extending surface of voice coil 48 has a plurality of holes 49 therethrough to permit free flow of fluid within the actuator 36. Without holes 49, movement of voice coil 48 would be restricted due to trapping of the fluid between coil 48 and pole piece 46. Conductive wire 47, usually copper, forms the windings of voice coil 48.

An electromagnetic actuator of the type suitable for this application can be purchased from the Kimco Division of BEI Motion Systems in San Marcos, Calif. Bushing 51 performs the double function of providing reduced sliding friction for movement of spool 50 and sealing chambers 14 and 16 from each other. With regard to its sealing function, it is preferred that bushing 51 not perfectly isoltate the two chambers, particularly in applications where a single volume compensator of the Jones type is utilized. Leakage across bushing 51 will permit both chambers 14 and 16 to benefit from the compensating ability of the compensator. The two passageways 58 and 60 are of sufficiently large diameter relative to their lengths so as to minimize throttling of the fluid. A plurality of openings 64 in housing 62 provide fluid access to the voice coil 48. Attachment bolts 66 extend through auxiliary housing 38, intermediate member 40 and are threadably secured in housing 12 (FIG. 1).

By varying the flow of current passing through voice coil 48, the strength and direction of magnetic field induced within the windings of coil 48 can be varied to change the position of coil 48 relative to pole piece 46. Spool 50 will "pump fluid" in response to movement of coil 48 resulting in energy being input into the fluid in parallel with the inertia track 18 altering the rate of fluid oscillation in the system. By properly controlling the rate of movement of spool 50, the passively generated forces of the mount (e.g., the damping forces of the elastomer blocks 28 and resistance to fluid flow in the system), can be counteracted to drive the dynamic stiffness of the mount to zero. Accordingly, regardless of the magnitude of the vibration of the disturbance source at this notch frequency (or any frequency where the dymanic stiffness can be made zero), no vibrational forces will be transmitted from the source across the mount to the airframe, since the magnitude of the steady-state force transmitted is a product of the dynamic stiffness (in this case, zero) and the displacement. Note, however, that it is not desirable to create a dynamic stiffness of zero at low frequencies coinciding with wing flapping and engine bounce modes of vibration. Leakage across busing 51 can be desgned to limit the ability of the mount to generate forces at frequencies below a critical frequency (e.g., below about 5-10 Hz).

Figure 2:
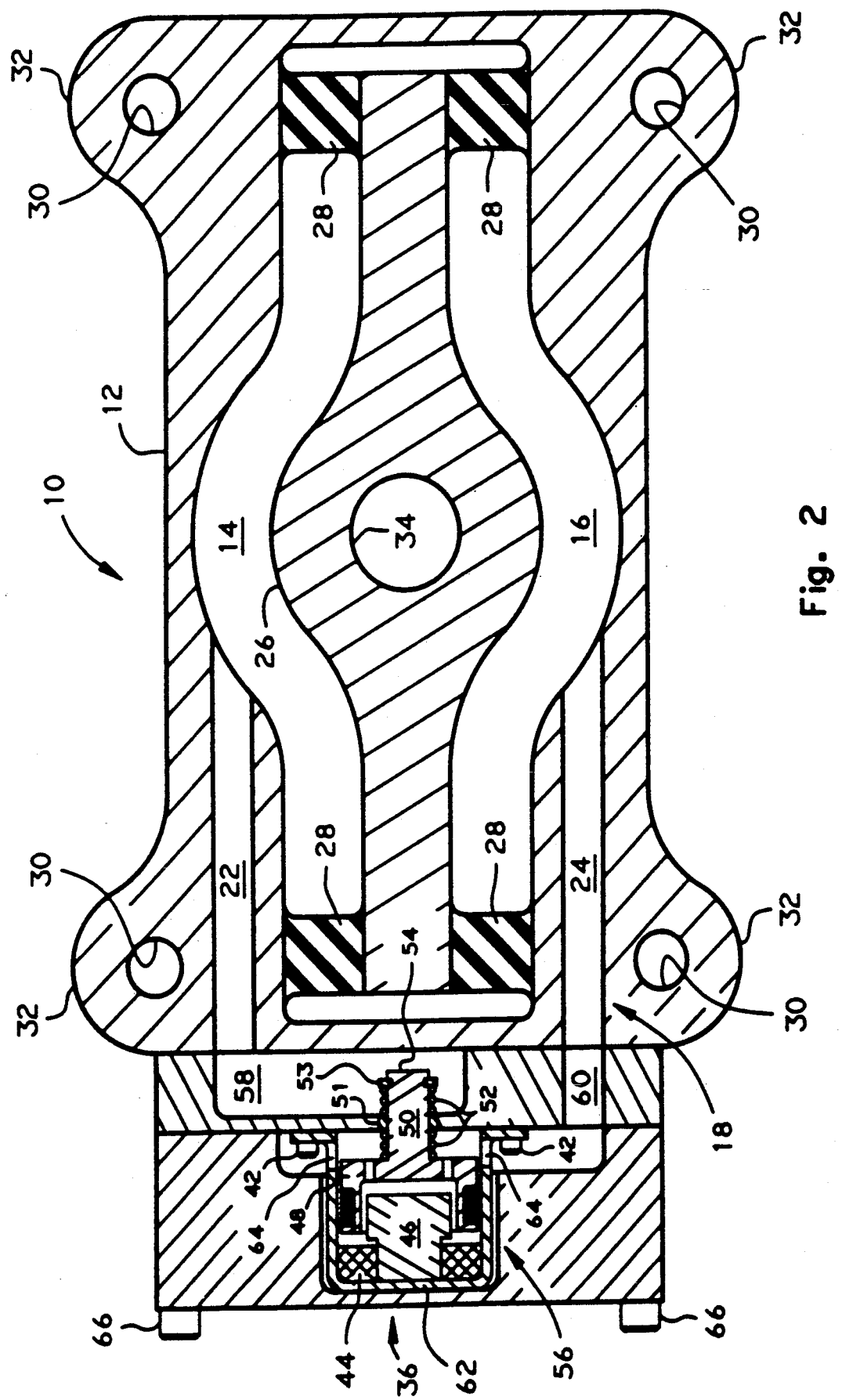
FIG. 2 is a cross-sectional side view similar to FIG. 1 of a second embodiment of the mount of the present invention.

FIG. 2 depicts a second preferred embodiment of fluid mount 10 in which actuator 36 is provided directly in inertia track 18. In this embodiment, the inertia track is formed directly in the mount by passageways 22 and 24 along with passgeways 58 and 60. For the embodiment of FIG. 1 in which the actuator 36 acts in parallel with the inertia track 18, optimum control performance will be at the notch frequency and above, whereas for the FIG. 2 embodiment in which the actuator is in series with the inertia track, optimum control performance is at the notch frequency and below. This difference in performance is a result of a fundamental difference in operation of the two differing configurations. The in-series actuator influences the behavior of the fluid in the system by influencing the behavior in the inertia track fluid slug whereas the in-parallel actuator of FIG. 1 inputs energy directly into chambers 14 and 16. The direct input of energy permits more to be done with smaller amounts of fluid movement and, hence, can be done more quickly (i.e., at higher frequency).

Figure 3:
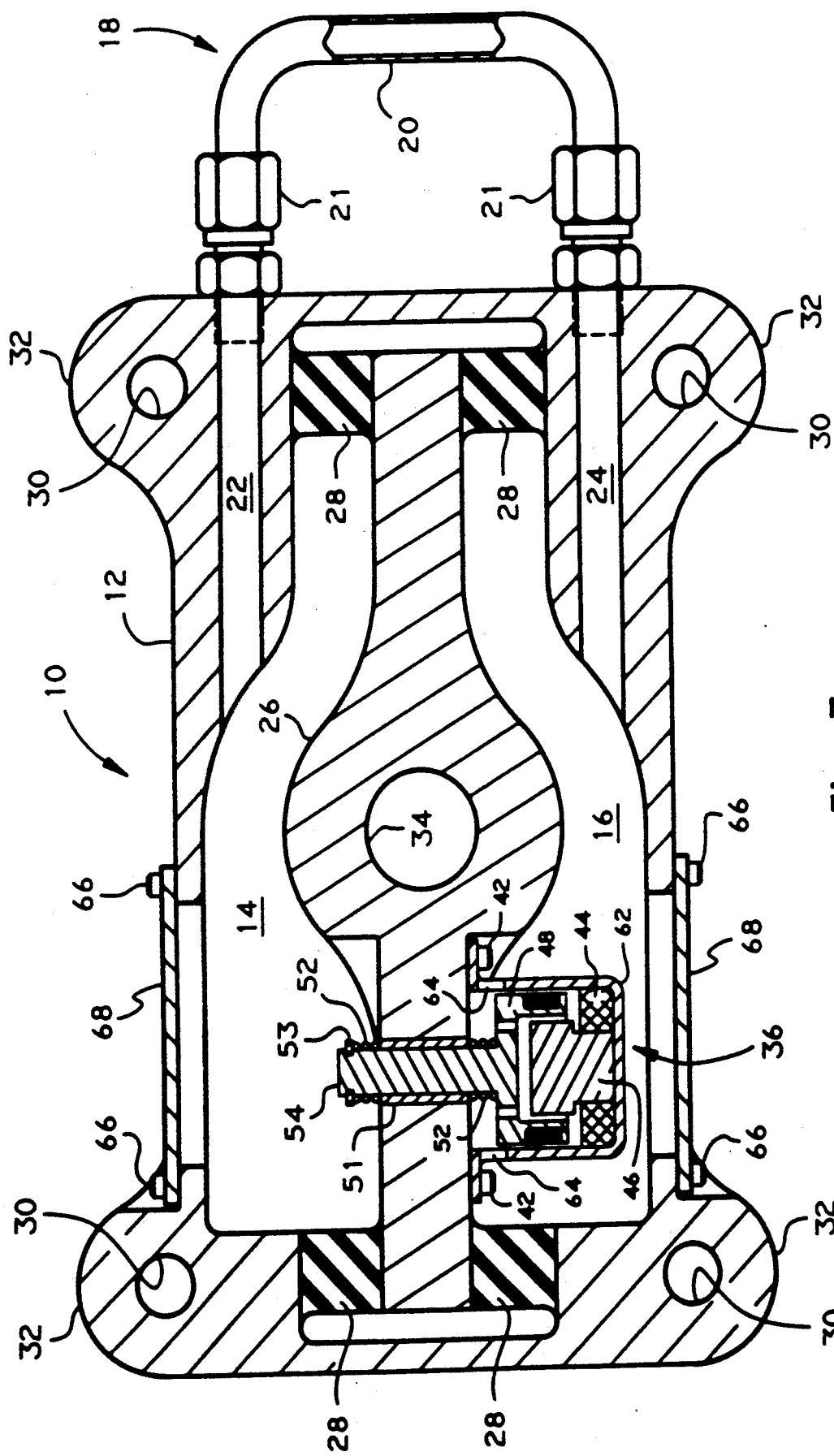
FIG. 3 is a cross-sectional side view similar to FIG. 1 of yet a third embodiment of the mount of the present invention.

FIG. 3 illustrates a third preferred embodiment in which actuator 36 acts through piston 26, also in parallel with inertia track 18. Attachment bolts 66 secure access plates 68 which facilitate assembly of the actuator 36 to the piston 26. The upper and lower faces of piston 26 have been configured to permit the actuator to be installed from either the top or bottom of the mount 10.

Figure 4:
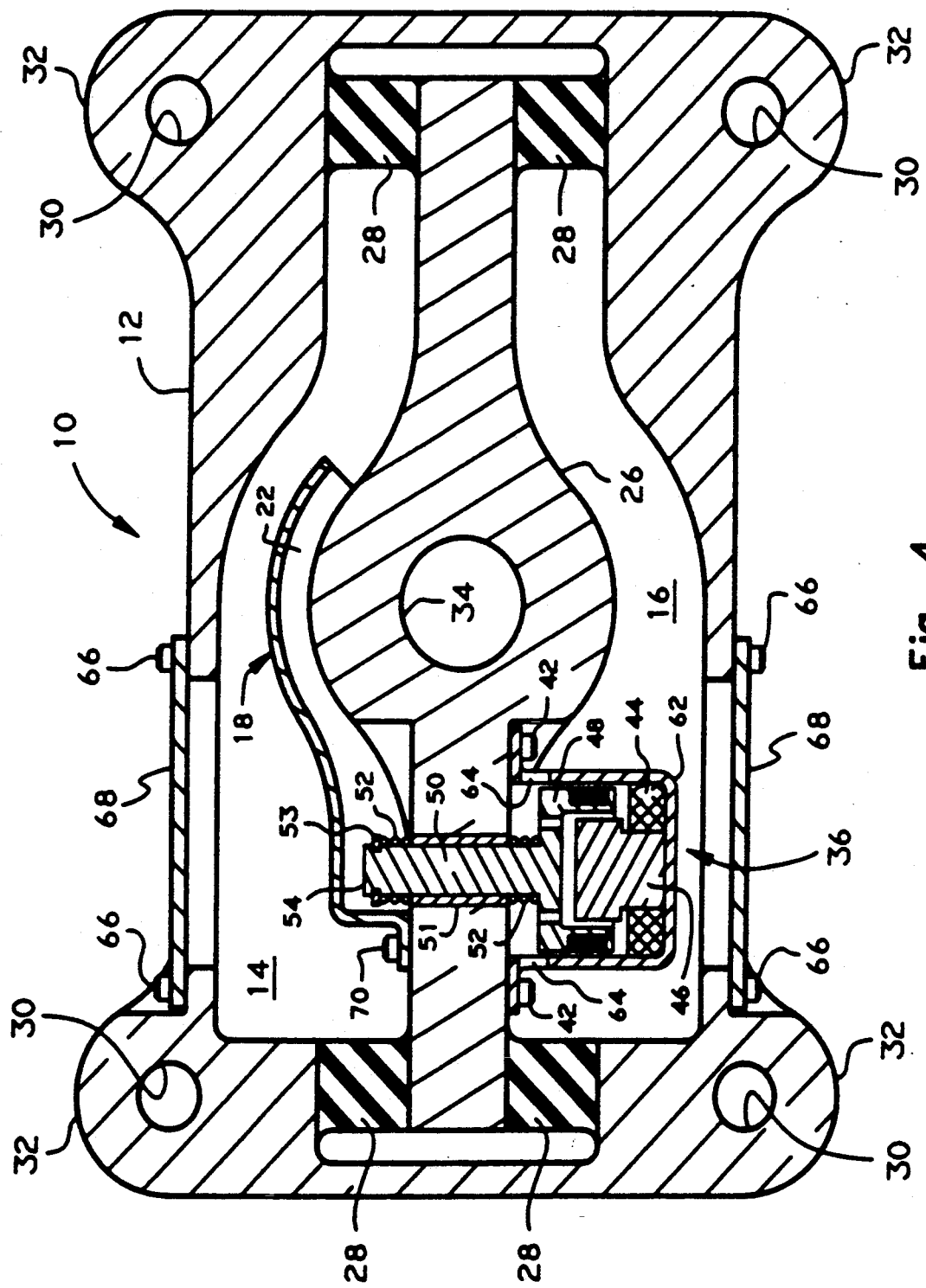
FIG. 4 is a cross-sectional side view similar to FIG. 1 of a fourth embodiment of the mount of the present invention.

FIG. 4 depicts a fourth embodiment that is structurally similar to the embodiment of FIG. 3, but functionally similar to the embodiment of FIG. 2. As in the FIG. 3 embodiment, actuator 36 is mounted on, and acts through, piston 26. However, in this embodiment, inertia track 18 is formed as a sheet metal stamping that is bolted to the piston 26 by a plurality of fasteners 70 (one shown), the sheet metal stampling having a passageway 22 formed therein. Actuator 36 is positioned to function in series with inertia track 18, that is, to input energy into the mount by modifying the rate of fluid oscillation within the inertia track. Access panels 68, again, permit access to piston 26 to facilitate installation of actuator 36 and, in this embodiment, sheet metal inertia track 18. When the actuator 36 is inactivated, the pressure buildup on the side of piston 26 toward which movement is occurring will cause the spool 50 to react against the corresponding centering spring 52 to transmit vibrational energy to the other fluid chamber. Accordingly, for this and the FIG. 2 embodiment, the means for fluidically interconnecting chambers 14 and 16 includes spool 50 as well as auxiliary passageways 22, 24, 50 and 60.

Figure 5:
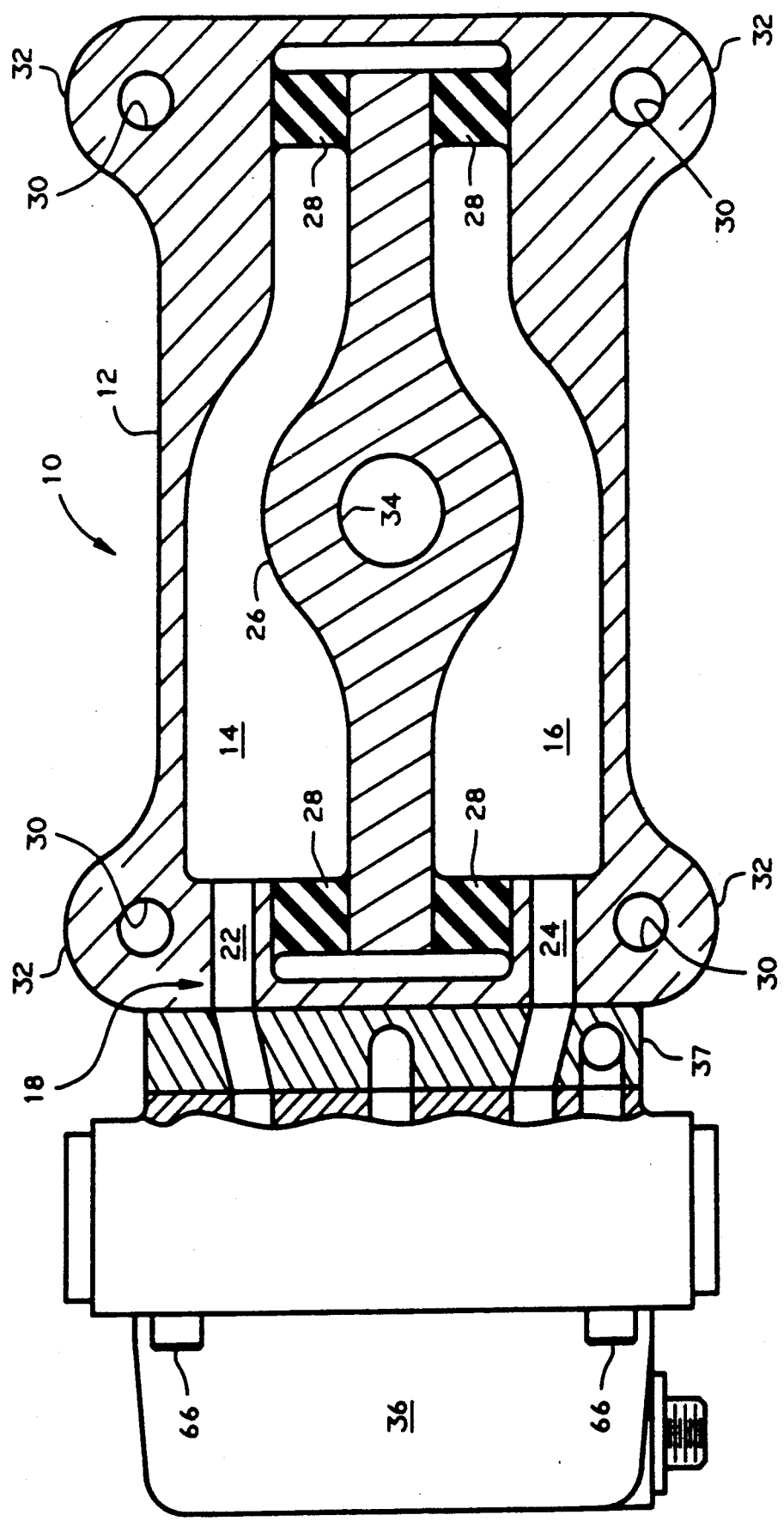
FIG. 5 is a side view in partial section of still a fifth embodiment of the mount.
Figure 7:
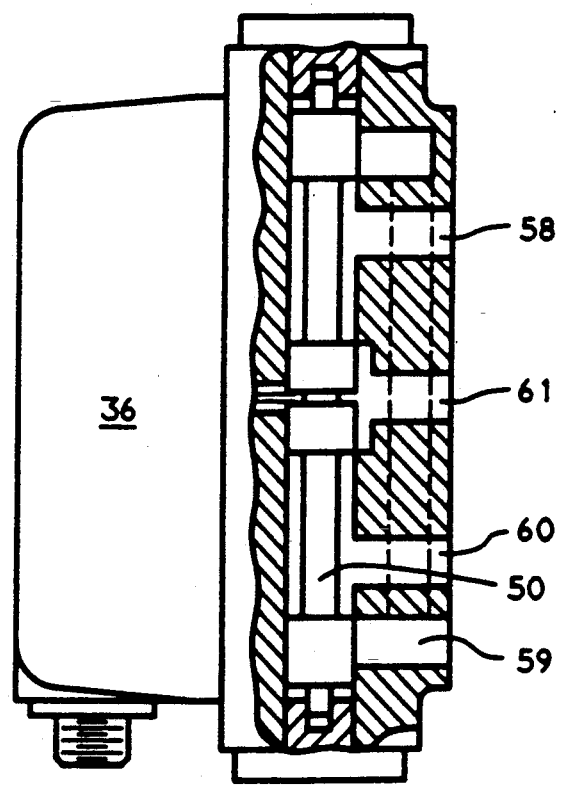
FIG. 7 is a cross-sectional side view similar to FIG. 6 detaining the features of a servo-hydraulic actuator which may be used in the present mount.

A fifth embodiment of the fluidic mount of the present invention is shown in FIG. 5 with the details of actuator 36 shown in FIG. 7. The essential differences in this embodiment are in the actuator 36, which is a servohydraulic type, interconnected to housing 12 through manifold 37. An electrohydraulic servovalve suitable for this application is available from Moog Controls Division and is identified as the Moog Series 72 servovalve. As best seen in FIG. 7, external pressure source (not shown) feeds hydraulic fluid through manifold 37 into entrance port 59, through passageways 58 and 60 to internal tracks 22 and 24, respectively, and to a return line (not shown) extending through manifold 37 through exit port 61, all under the control of spool 50. The armature of the electromagnetic controller (not shown) monitors the opening in valves that distribute hydraulic fluid to the ends of spool 50 to actuate its movement in a conventional manner. For fixed wing applications, electromagnetic actuation will be preferred. However, for rotary wing applications, the use of a servovalve is preferred because of the additional power that can be generated. In many fixed wing applications where the fluidic mount has been designed to produce a notch, only a small amount of power is needed to provide the desired control. Hence, the preference for the electromagnetic actuator that provides faster response. In some applications such as helicopter pylon mounting, greater power may be needed to generate the forces necessary to cancel out the vibrational energy of the source. Hence, for those applications the servovalve would be preferred.

Figure 8A:
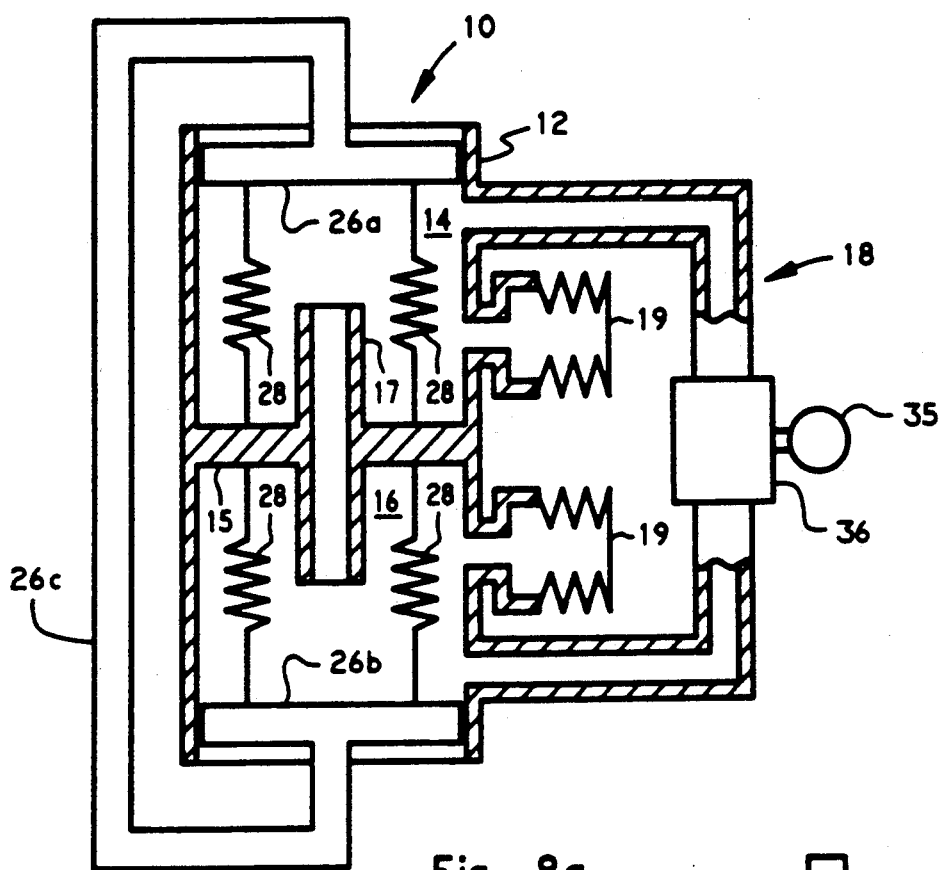
FIG. 8a is a schematic illustration of a sixth embodiment of an active system as it may be used as a tuned absorber.

FIG. 8a schematically depicts a tuned absorber application. In this embodiment the piston is shown as being subdivided into two separate pistons 26a and 26b which are interconnected by rod 26c and move within housing 12 under influence of springs 28. It will be appreciated that this embodiment could also employ the more conventional double pumper piston 26 of FIG. 1 and associated housing geometry. Although springs 28 are schematically depicted as coil springs, they will more conventionally comprise elastomeric springs, as in previous embodiments, that will seal the pistons 26a and 26b against the housing 12. Inertia track 18 interconnects fluid chambers 14 and 16 which are divided by fixed wall 15. A secondary inertia track 17 extends through wall 15. Each chamber 14 and 16 is shown as being equipped with a compliance chamber 19. In use, one or more fluidic members 10 will be suspended by rod(s) 26c from the structure from which energy is to be absorbed. The housing 12, inertia track 18 and fluid within the entire system will become a counterbalancing weight which, under the influence of actuator 36, is controlled to absorb the vibration of the structure by vibrating out of sync therewith. The sloshing of the fluid through inertia tracks 17 and 18 of one or more absorbers 10 will provide the inertial forces necessary to cancel the vibrational pulses of the structure. While the application of fluidic member 10 as a tuned absorber has been discussed only with respect to the FIG. 8a embodiment, it will be readily understood that any embodiment disclosed herein could be used as a tuned absorber.

Figure 8B:
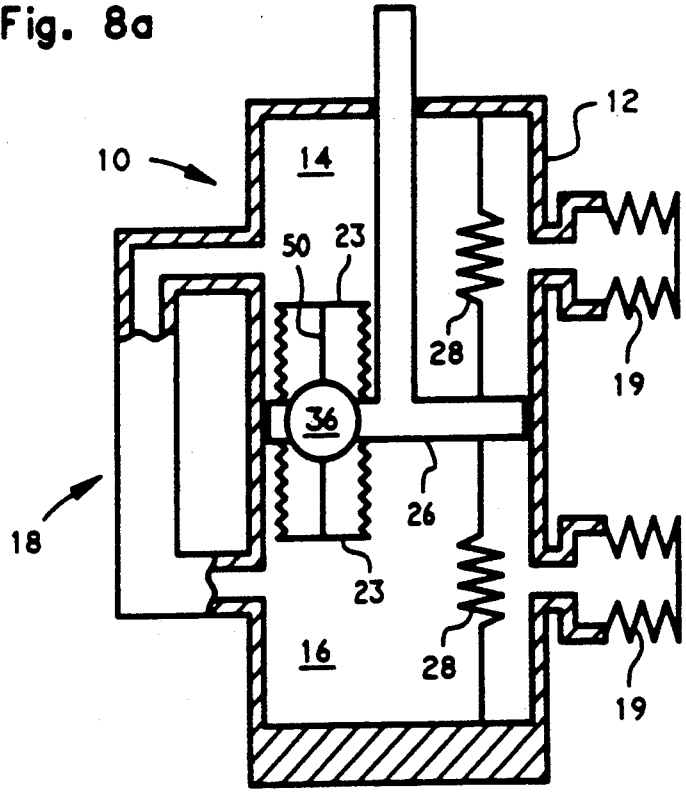
FIG. 8b is a schematic depiction of a seventh embodiment of the fluid mount of the present invention incorporating a sealed fluid actuation unit.

FIG. 8b schematically depicts a seventh embodiment in which actuator 36, preferably of the electromagnetic variety, acts through piston 26, as in the case of the FIGS. 3 and 4 embodiments. Distinctive to this embodiment is that first and second bellows 23 surround actuator 36 and seal off its operating fluid (which may be air) from the remaining fluid within housing 12. Bellows 23 can perform the function of centering springs 52 with spool 50 attached to the ends of each bellows 23. Movement of spool 50 expands one bellows while contracting the other to effect the vibrational energy input substantially in the same manner as the embodiments of FIGS. 1 and 3, that is, in parallel with the inertia track 18. Use of bellows 23 eliminates the requirement for bushing 51 to provide a partial seal. In addition, separate centering springs 52 are unnecessary since bellows 23 perform this function. It will be apparent that any of the other embodiments would be modified to permit incorporation of the bellows 23.

Figure 9:
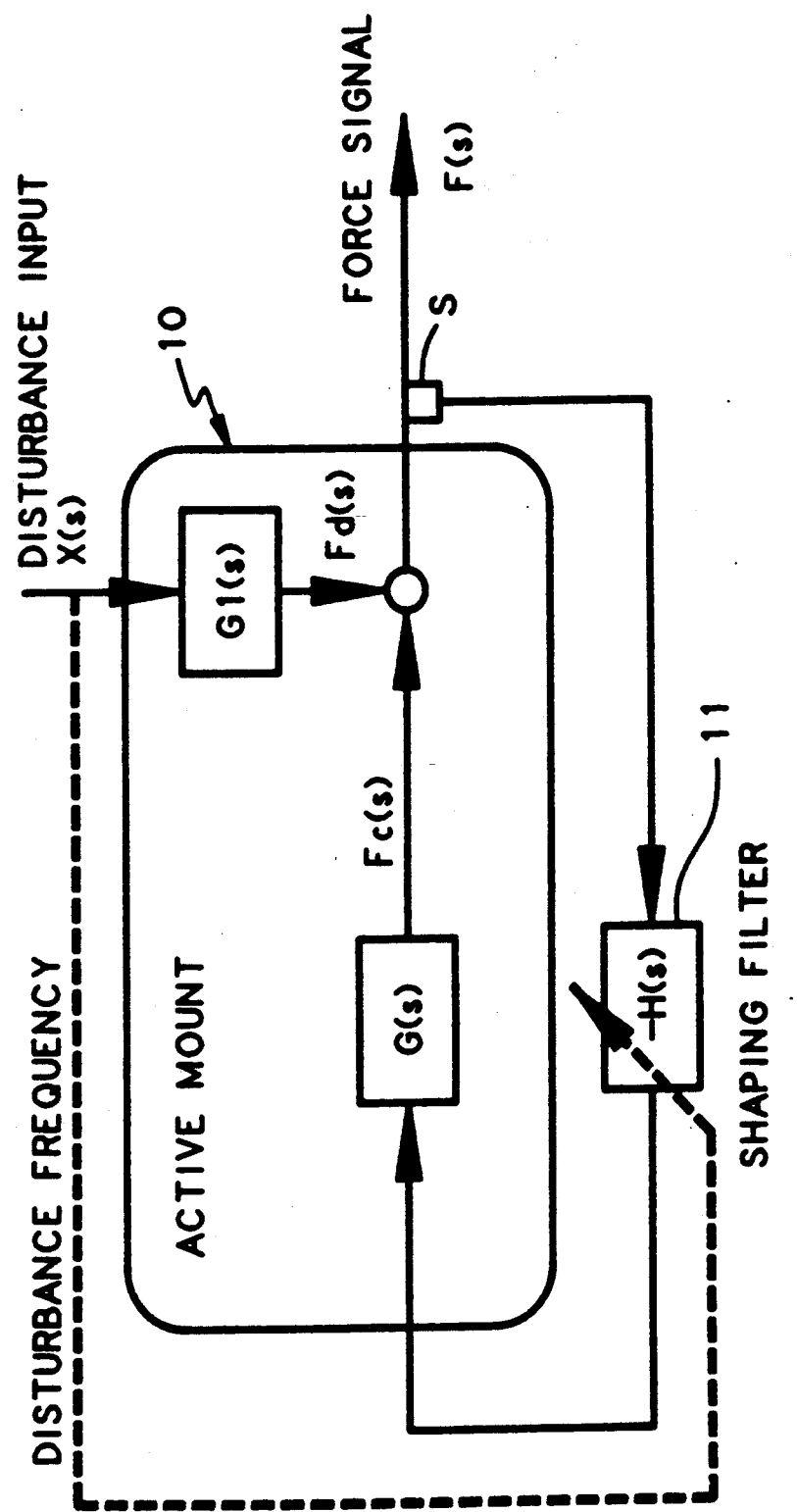
FIG. 9 is a schematic line drawing of a control system which may be used in conjunction with the present mount.

FIG. 9 is a schematic line drawing of a control system useful with the fluid mount 10 of the present invention. The control theory used herein is frequency-shaped feedback. A disturbance input X(s) representative of a motion input excites mount 10. A feed forward transfer function G1(s) is representative of the uncontrolled (passive) dynamic stiffness of the mount. As the disturbance input X(s) encounters the mount 10, the transfer function G1(s) will determine the magnitude of Fd(s), the force transmitted across the controlled mount 10. Optionally (as shown by dotted line) the frequency of the disturbance X(s) can be sampled. The sampling is used to alter the filter characteristics if the shaping filter 11 includes the capability to modify its performance characteristics. H(s) has a negative value by convention.

In some instances (e.g., when the disturbance is known to be broadbanded in nature), sampling is unnecessary since the characteristics of the shaping filter 11 will be determined prior to assembly. The force transmitted by the mount F(s) is the sum of Fd(s) and Fc(s). F(s) is measured by the sensor S and input to the shaping filter 11. While sensor S is preferably a force sensor, it could measure any one of a plurality of variables including displacement of a structural member, velocity of a structural member, acceleration of a structural member, force exerted upon a structural member, flow rate of fluid in the inertia track, and pressure in one of the chambers. The force signal shaped by filter 11 is input to G(s) which is representative of the force generated by the mount per unit of control signal. The output Fc(s) will be summed with Fd(s) in the mount 10 to control the force signal F(s) transmitted to the base in a desired manner.

Figure 10A:
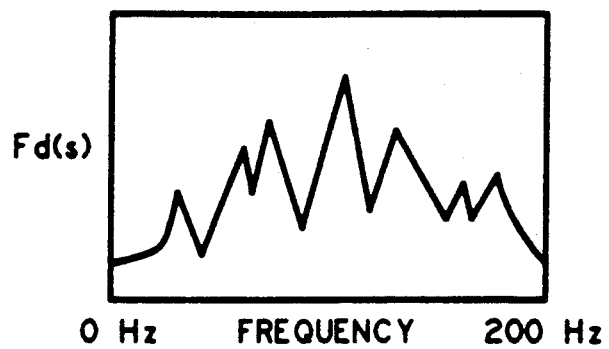
FIG. 10a is a representative plot of the input force disturbance spectrum Fd(s) for a broadband disturbance.
Figure 10B:
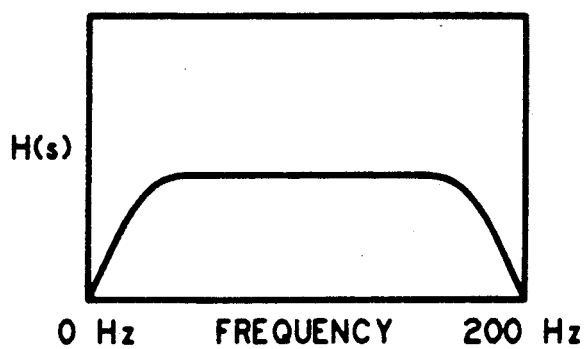
FIG. 10b is a plot of the shaping filter specturm H(s) for the broadband disturbance.
Figure 10C:
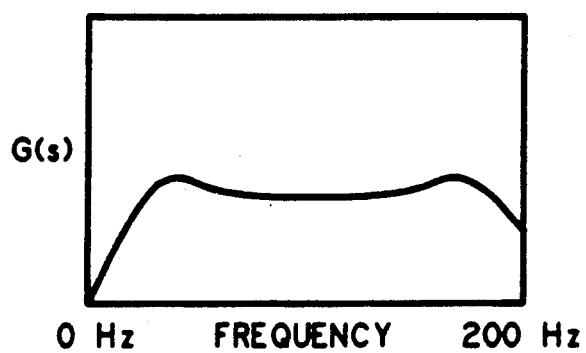
FIG. 10c is a plot of the isolator response spectrum G(s) for the broadband disturbance.

FIGS. 10a, 10b and 10c are representative graphic depictions of Fd(s), H(s) and G(s) for a broadband disturbance spectrum X(s). Because the frequency of the input is broadbanded, the shaping filter is designed to have a relatively flat response. Accordingly, the active mount is designed to have a generally flat response G(s).

Figure 11A:
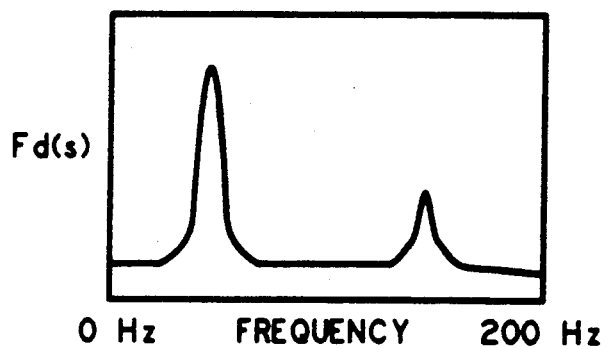
FIG. 11a is a plot Fd(s) similar to FIG. 10a for an input disturbance having two primary excitation frequencies.
Figure 11B:
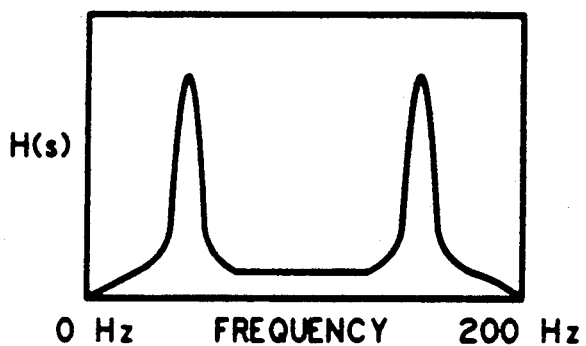
FIG. 11b is a plot H(s) similar to FIG. 10b for an input disturbance with two primary frequency spikes.
Figure 11C:
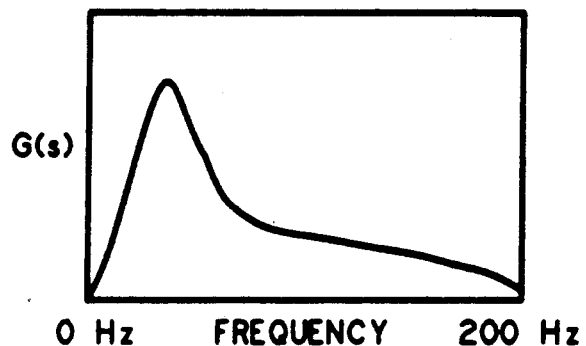
FIG. 11c is a plot of G(s) similar to FIG. 10c for an input disturbance with two primary frequency spikes.

FIGS. 11a, 11b, and 11c show curves for the same parameters as FIG. 10 for a disturbance spectrum in which two frequencies dominate. As a result of sampling the disturbance frequencies, the filter H(s) (FIG. 11b) is characterized to maximize its response at the two frequencies in question. Again, the response of the isolator (FIG. 11c) shows that the maximum force is generated at about 60 Hz, for example, at the primary disturbance frequency to initialize control of the vibration of the system and tapers off throughout the range over which control is desired, although the mount is still able to provide adequate control at the secondary disturbance frequency. If, in another example, the disturbance frequency spectrum contained a single dominant frequency but the system was known to be particularly sensitive to another frequency, the second peak of the filter 11 (FIG. 11b) could be placed to control vibrations at the frequency of susceptibility.

Figure 12A:
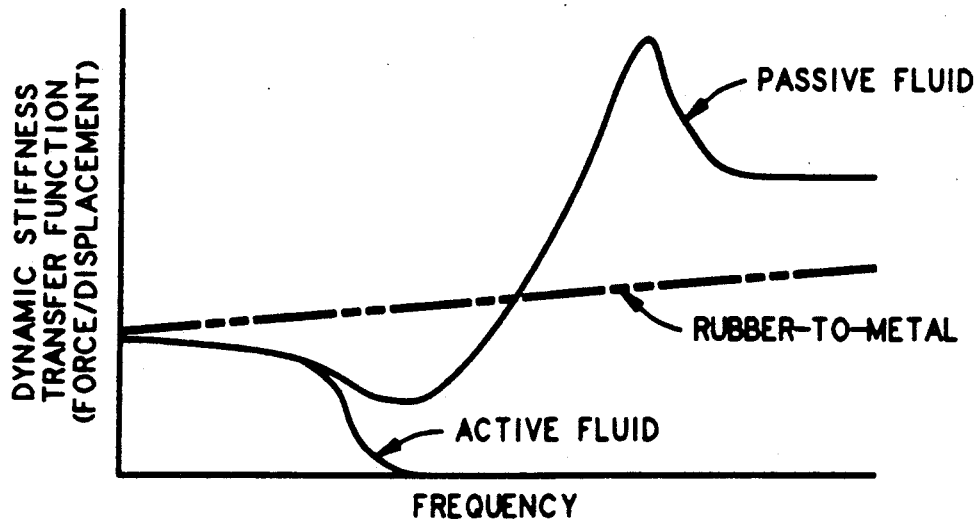
FIG. 12a is a comparison plot of the dynamic stiffness envelopes for a passive elastomeric, a passive fluid and an active fluid mount for a single or double frequency disturbance.

FIG. 12a is a plot of the dynamic stiffness envelope involving a single primary disturbance frequency swept through the disturbance frequency range for three types of mounts: conventional rubber-to-metal, passive fluid and active fluid. The stiffness of the conventional rubber-to-metal mount increases with frequency. The passive fluid mount can be designed to be soft at a particular frequency but that frequency is fixed. With the active fluid mount, the response of the mount can be varied to produce a dynamic stiffness that goes to zero and the rate of vibration of the actuator is varied to keep it there. The performance benefits of the active fluid mount are readily seen.

Figure 12B:
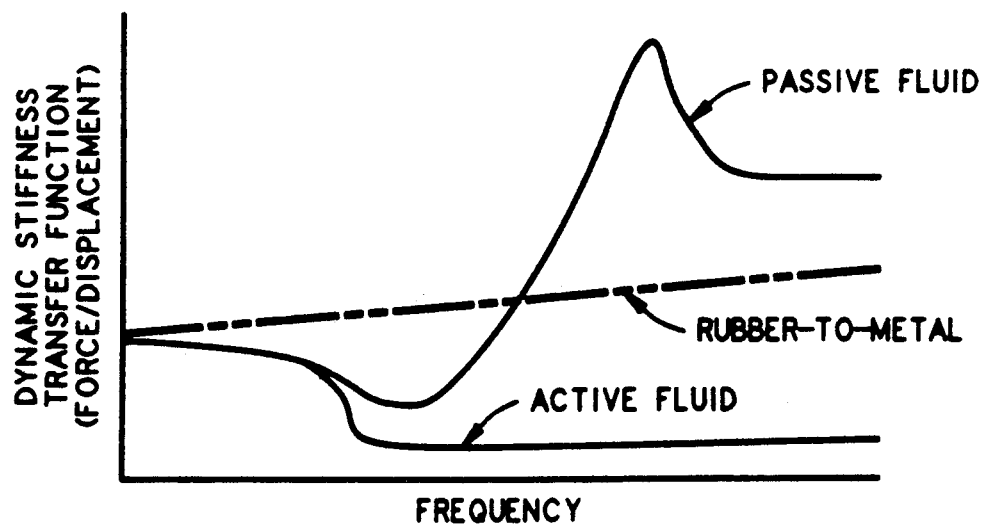
FIG. 12b is a comparison plot of the dynamic stiffness envelopes for the same three mounts for a broadband disturbance.

FIG. 12b shows a plot of the dynamic stiffness for the three types of mounts incurring a broadband disturbance. Again, the performance superiority of the active fluid mount of the present invention is readily apparent.

Figure 12C:
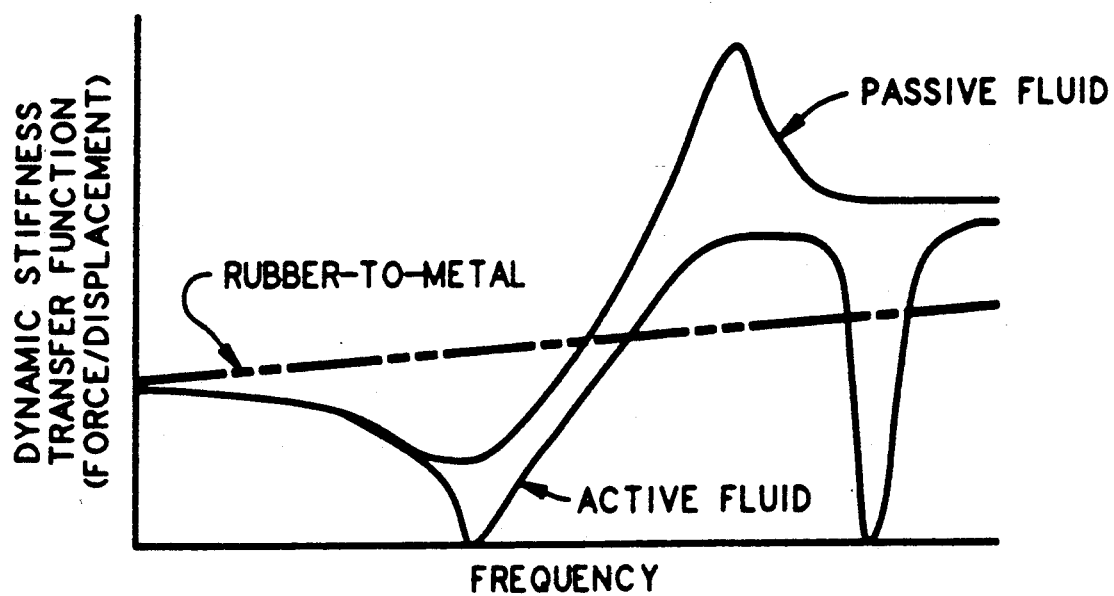
FIG. 12c is a comparison plot of an instantaneous dynamic stiffness plot for the same three mounts for a disturbance characterized by a primary and a secondary frequency.

FIG. 12c depicts the instantaneous dynamic stiffness of a fluid mount 10 provided with a filter 11 to handle two discrete frequencies (FIG. 11b). As is shown, the mount is made to have dynamic stiffness at or near zero for these two disturbance frequencies. Since the disturbance input is focused at these two frequencies, the capability of the active fluid mount to virtually eliminate transmission of vibrational energy at these frequencies distinguish it as being superior. Note, also the passive fluid mount has a natural resonant frequency (FIG. 12c, peak) that without capability to add damping, could prove troublesome if the disturbance spectrum contains any energy at this frequency.

The present invention is directed to seven embodiments of a fluid device 10 for actively controlling vibration. A passive double pumper mount is modified by the inclusion of an actuator 36, which may be of the electromagnetic or servohydraulic type, in the primary (18) or in a secondary (56, 58, 60) inertia track. The actuator can be used to alter the vibrational energy transmitted between the fluid chambers 14 and 16 to decrease the dynamic stiffness of the mount at critical frequencies in order to control the transmission of vibration to the support structure.

Various changes, alternatives and modifications will become apparent to one of ordinary skill in the art following a reading of the foregoing specification. For example, although a single actuator has been depicted in each embodiment, obviously a pair of electronically meshed actuators, one in each chamber, could be employed. It is intended that all such changes, alternatives and modifications as fall within the scope of the appended claims be considered part of the present invention.

We claim:

1. An apparatus for controlling the amount of vibration induced by a first member in a second member, comprising:
   a) a housing;
   b) a first fluid-filled compliant chamber;
   c) a second fluid-filled compliant chamber;
   d) means for interconnecting said first and second chambers;
   e) at least one piston having a first side for transmitting energy from the fluid in said first chamber through said interconnecting means to said second compliant chamber and a second side for transmitting energy from said fluid in said second chamber through said interconnecting means to said first compliant chamber, said transmitting of energy from both said first and second chambers being responsive to relative movement between said first vibrating member and said second member, said piston being connected to one of said first and second members;
   f) energy input means consisting essentially of an actuator fluidically interconnecting said first and second compliant chambers to actively augment the transmission of energy caused by said at least one piston;
whereby the amount of vibrational energy in said second member can be controlled in a desired manner.

2. The apparatus of claim 1 wherein said means for interconnecting comprises at least one passageway fluidically interconnecting said first and second fluid-filled chambers.

3. The apparatus of claim 2 wherein said actuator is in parallel with said at least one passageway for modifying the oscillation of fluid within some portion of said apparatus.

4. The apparatus of claim 3 wherein said actuator comprises an electrohydraulic servovalve.

5. The apparatus of claim 3 wherein said actuator comprises an electromagnetic actuator.

6. The apparatus of claim 3 further comprising a pair of bellows extending into said first and second fluid-filled compliant chambers and which contain said actuator, whereby said actuator is isolated from the fluid within said fluid-filled chambers.

7. The apparatus of claim 2 wherein a spool of said actuator is interconnected in series with said passageway.

8. The apparatus of claim 7 wherein said energy input means comprises said actuator which extends between said first and second chambers in order to influence transmission of energy therebetween.

9. The apparatus of claim 8 wherein said actuator comprises an electrohydraulic servovalve.

10. The apparatus of claim 8 wherein said actuator comprises an electromagnetic actuator.

11. The apparatus of claim 8 further comprising a pair of bellows extending into said first and second fluid-filled compliant chambers and which contain said actuator, whereby said actuator is isolated from the fluid within said fluid-filled chambers.

12. The apparatus of claim 2 wherein said at least one piston comprises a pair of movable pistons coupled together for simultaneous movement in said first and second chambers, respectively, on opposite sides of an intermediate dividing wall which is fixed in said housing.

13. The apparatus of claim 12 wherein said intermediate dividing wall further comprises a secondary passageway extending through said dividing wall fluidically communicating with said first and second fluid-filled chambers.

14. The apparatus of claim 1 wherein said housing is connected to the other of said first and second members.

15. The apparatus of claim 14, said second member further comprising a relatively stationary structural support such as an engine-mounting pylon.

16. The apparatus of claim 2 further comprising sensor means to detect at least a single variable from the group including displacement of a structural member, velocity of a structural member, acceleration of a structural member, force exerted upon a structural member, flow rate of the fluid in said passageway, and pressure in at least one of said fluid chambers, to provide a feedback signal for adjustment of said energy input means.

17. Apparatus for controlling operation of an isolation system which has stiffness means for attaching a disturbance source which, in operation has a plurality of excitation frequencies which define a disturbance spectrum, to a structure to be isolated and actuation means for imparting a controlled force between the disturbance source and said structure to be isolated, said apparatus comprising:

a) signal generation means including
   i) sensing means for measuring a force transmitted by said isolation system to said structure to be isolated, and
   ii) means for generating a signal responsive to at least a portion of said disturbance spectrum;
b) compensation means for filtering said generated signal and developing an output, said compensation means having a frequency content generally similar to that of said at least a portion of said disturbance spectrum;
c) control means for activating said actuation means in such a manner as to reduce said magnitude of said transmitted force.

18. Apparatus according to claim 17 wherein said compensation means accentuates frequencies corresponding to structural resonance frequencies which do not dominate the disturbance spectrum.

19. Apparatus according to claim 17 wherein said compensation means further comprises sensor means for determining dominant frequencies of said disturbance spectrum.

20. An active fluid isolation mount for isolating an aircraft engine from its support structure comprising
a) a housing, said housing being adapted for attachment to said engine;
b) a piston mounted in said housing, said piston adapted for connection to said support structure;
c) means for isolating said piston from said housing, said means including
   i) elastomeric means bonded to said piston and said housing;
   ii) a first fluid-filled chamber having a first volume stiffness on one side of said piston;
   iii) a second fluid-filled chamber having a volume stiffness which is substantially similar to said first volume stiffness on another opposite side of said piston;
   iv) at least one passageway fluidically interconnecting said first and second fluid-filled chambers in order to enable the transmission of vibrational energy between said chambers;
   v) an actuator associated with and directly fluidically interconnected to said at least one passageway for actively altering an amount of vibrational energy transmitted between said chambers in order to control the amount of vibrational energy in said support structure in a desired manner.

* * * * *

UNITED STATES PATENT OFFICE
CERTIFICATE OF CORRECTION

PATENT NO. : 5,174,552  
DATED : Dec. 29, 1992  
INVENTOR(S) : Hodgson et al., Cary, NC Page 1 of 2

It is certified that error appears in the above-identified patent and that said Letters Patent is hereby corrected as shown below:

Col. 1, line 65, change "automative" to --automotive--.

Col. 2, line 15, change "yeild" to --yield--.

Col. 2, line 47, change "space" to --spaced--.

Col. 2, line 58, change "perferable" to --preferable--.

Col. 3, line 31, change "doulbe" to --double--.

Col. 4, line 30, change "secturm" to --spectrum--.

Col. 5, line 14, change "Elastomerr" to --Elastomer--.

Col. 5, line 35, change "turned" to --tuned--.

Col. 5, line 45, change "postion" to --position--.

Col. 6, line 35, change "dymanic" to --dynamic--.

Col. 6, line 43, change "busing" to --bushing-- and "desgned" to --designed--.

Col. 6, line 50, change "passgeway" to --passageway--.

UNITED STATES PATENT AND TRADEMARK OFFICE
CERTIFICATE OF CORRECTION

PATENT NO.   : 5,174,552
DATED        : December 29, 1992
INVENTOR(S)  : Hodgson et al., Cary, NC It is certified that error appears in the above-indentified patent and that said Letters Patent is hereby corrected as shown below:

Col. 7, line 13, change "stampling" to --stamping--.

Signed and Sealed this

Twenty-sixth Day of October, 1993

Attest:

BRUCE LEHMAN

Attesting Officer

Commissioner of Patents and Trademarks